United States Patent [19]

Scorsiroli

[11] Patent Number: 4,918,780
[45] Date of Patent: Apr. 24, 1990

[54] WIPER ARM ASSEMBLY FOR MOTOR VEHICLES

[75] Inventor: Marcello Scorsiroli, Turin, Italy

[73] Assignee: Champion Spark Plug Italiana S.P.A., Italy

[21] Appl. No.: 229,016

[22] Filed: Aug. 5, 1988

[30] Foreign Application Priority Data

Aug. 7, 1987 [IT] Italy .............................. 67695 A/87

[51] Int. Cl.$^5$ ................................................. B60S 1/36
[52] U.S. Cl. .............................. 15/250.21; 15/250.23; 15/250.35
[58] Field of Search ........... 15/250.21, 250.13, 250.23, 15/250.29, 250.3, 250.35

[56] References Cited

U.S. PATENT DOCUMENTS

| 2,308,212 | 1/1943 | Scott-Iversent et al. |
| 3,003,173 | 10/1961 | Ziegler |
| 3,010,137 | 11/1961 | Krohm .......................... 15/250.21 |
| 4,447,928 | 5/1984 | Schuch et al. |
| 4,625,359 | 12/1986 | Egner-Walter et al. |

FOREIGN PATENT DOCUMENTS

| 1561319 | 3/1969 | France |
| 1429807 | 3/1976 | United Kingdom ............. 15/250.21 |
| 2162053 | 1/1986 | United Kingdom |

Primary Examiner—Harvey C. Hornsby
Assistant Examiner—Joseph S. Machuga
Attorney, Agent, or Firm—Wood, Phillips, Mason, Recktenwald & VanSanten

[57] ABSTRACT

The wiper arm assembly according to the invention comprises a mounting head (1) rigidly secured to a drive shaft (A-B), a channel (2) rotatably connected to the mounting head (1), spring means (4) capable of biasing the channel (2) towards the surface to be wiped, a sliding element (9) located inside the channel (2) and provided with an arm extension (3) for attaching thereto (3a) a wiper blade (not shown), and a rod (12) articulated at one of its ends (11) to the sliding element (9) and, at the other of its ends (11a), to the vehicle body (14) at a certain distance from the drive shaft (A-B). When the channel (2) is oscillating about the drive shaft (A-B) said rod (12) imports a back and forth movement to the sliding element (9) and thus to the arm extension (3) and to the wiper blade (not shown). Solid anti-friction means are provided between the sliding element (9) and the channel (2). The solid anti-friction means may consist of a plastic sheath (13), or of a ball bearing, or of a roller bearing, etc.

18 Claims, 3 Drawing Sheets

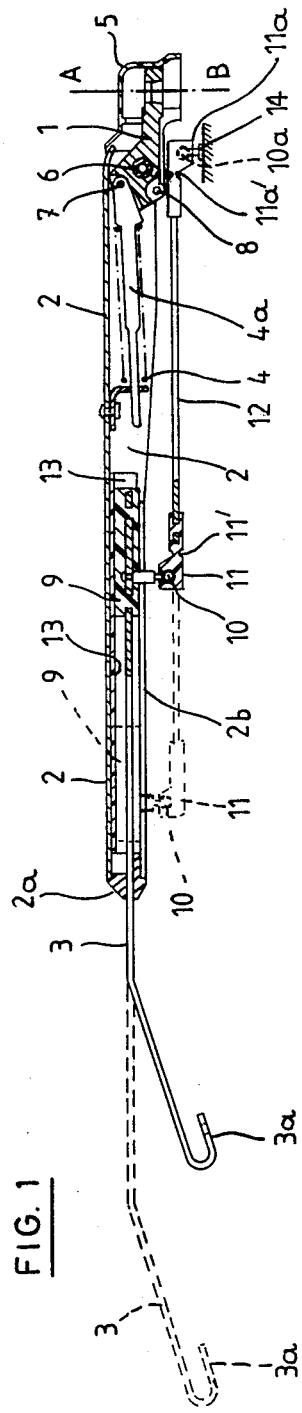
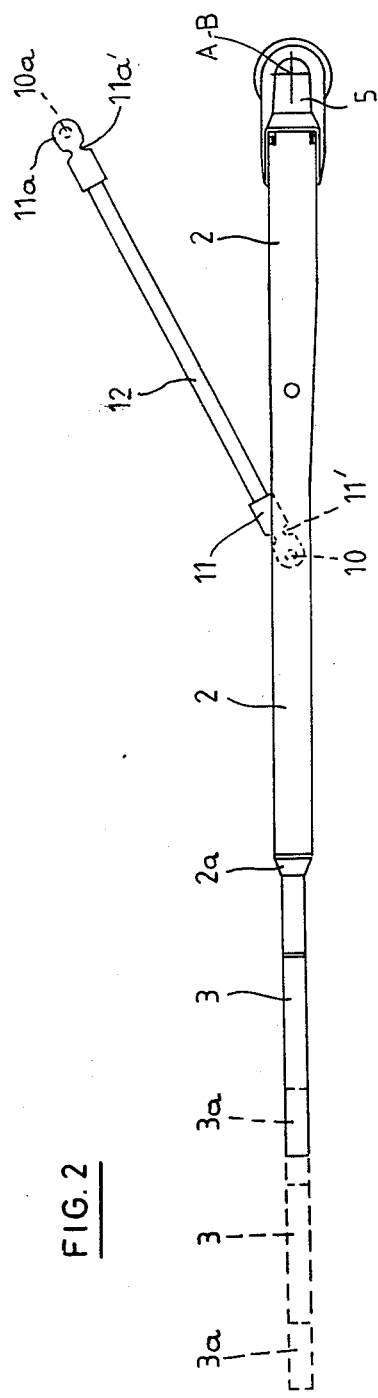
FIG. 1
FIG. 2

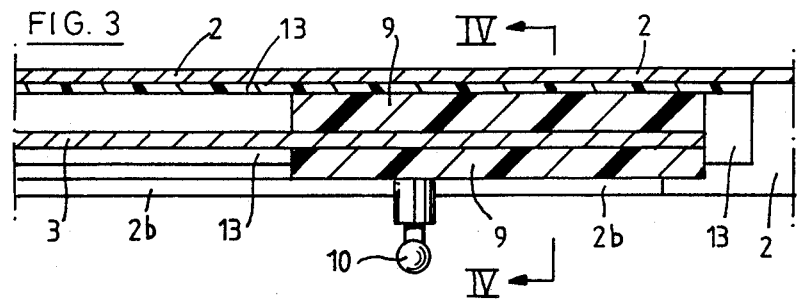
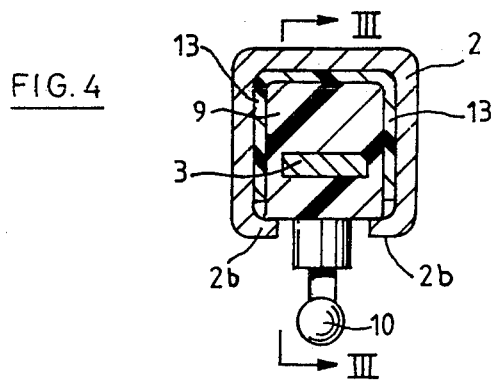
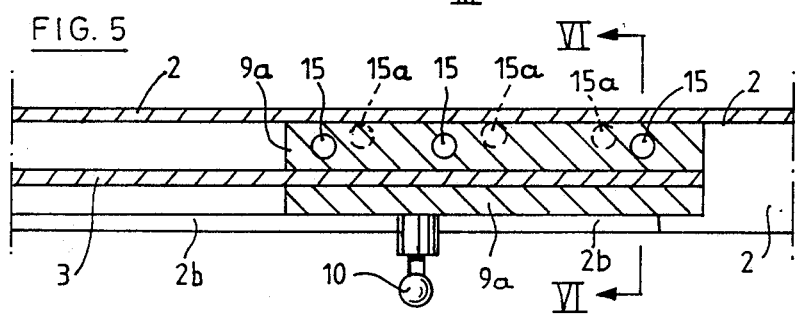
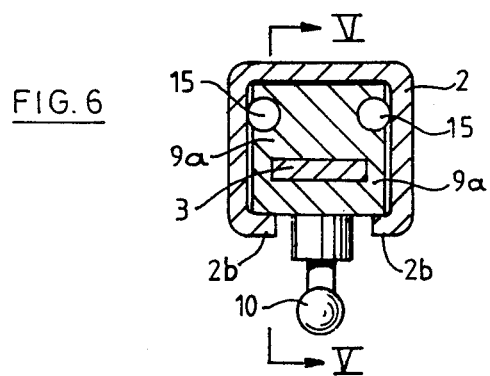

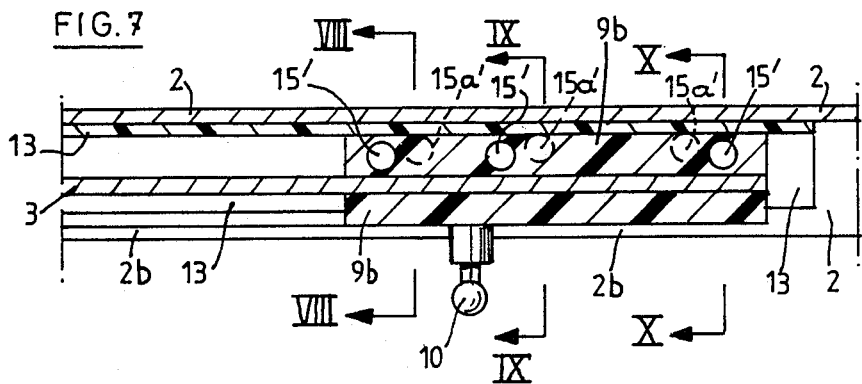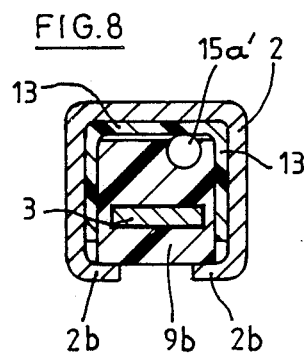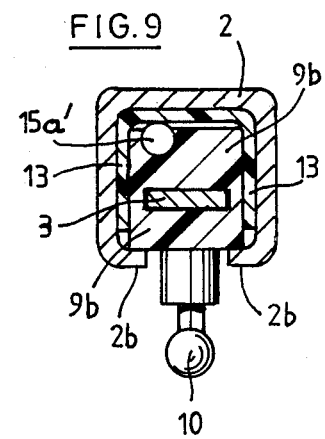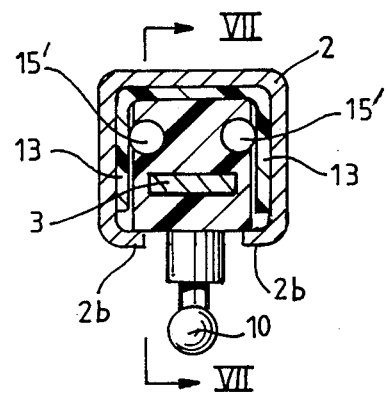

WIPER ARM ASSEMBLY FOR MOTOR VEHICLES

The present invention relates to a wiper arm assembly for motor vehicles or the like, comprising a mounting head rigidly secured to a drive shaft, spring means located inside a channel and capable of biasing the channel towards the surface to be wiped and a sliding element provided with an arm extension, wherein the sliding element is connected to the vehicle body by means of a rod provided with an articulation at both of its ends.

Wiper arm assemblies provided with a sliding element (for obtaining a larger wiping pattern) are known in prior art. However, the basic principle of these prior art arm assemblies is substantially different from the basic principle of the above defined assembly. The mentioned prior art wiper arm assemblies do not comprise a rod which is articulated to both the sliding element and the vehicle body and, to the contrary of the wiper arm assembly disclosed in the present specification, are all very complicated and expensive.

To the best knowledge of the applicant, there have been or there are presently no wiper arm assemblies on the market which show a structure similar to the one disclosed hereafter. The applicant is furthermore not aware of any publication describing a similar structure.

The object of the invention is (a) to provide a wiper arm assembly which is capable of covering a larger wiping area than conventional wiper arm assemblies, (b) to provide a wiper arm assembly of this type which is relatively simple in its structure and therefore not too expensive and (c) to provide a wiper arm assembly which works correctly over a long period.

The wiper arm assembly according to the invention is substantially characterized by the fact that the sliding element is located inside the said channel and that between the outer walls of the sliding element and the inner walls of the channel a macroscopic solid anti-friction means is provided.

It is to be noted that in the present specification and appended claims, the term "macroscopic solid anti-friction means" includes all anti-friction means of which the dimensions are not microscopic (graphite) and which are neither liquid nor viscous (oils, greases).

Other features of the wiper arm according to the invention are for example:
(a) that the channel is made of steel or the like,
(b) that the sliding element is made of steel or of plastic,
(c) that the solid anti-friction means is a metal or a plastic sheath,
(d) that the solid anti-friction means comprises steel or plastic balls,
(e) that the solid anti-friction means comprises steel or plastic rollers, and
(f) that the articulation at each end of the rod which connects the sliding element to the vehicle body is materialized by means of a ball joint.

The wiper arm assembly according to the invention will be better understood when reading the following portions of the description in conjunction with the appended drawings, wherein:

FIG. 1 is a sectional view along the longitudinal axial plane of the channel of the wiper arm assembly according to a first embodiment of the invention, FIG. 2 is a top view of the wiper arm assembly of FIG. 1, FIG. 3 is, at a larger scale, a sectional view of several elements of the first embodiment of the invention, FIG. 4 is, at a larger scale, a sectional view along line IV—IV of FIG. 3;

FIG. 5 is, at a larger scale, a sectional view of several elements of a second embodiment of the invention, FIG. 6 is, at a larger scale, a sectional view along line VI—VI of FIG. 5, FIG. 7 is, at a larger scale, a sectional view of several elements of a third embodiment of the invention, FIG. 8 is, at a larger scale, a sectional view along line VIII—VIII of FIG. 7, FIG. 9 is, at a larger scale, a sectional view along line IX—IX of FIG. 7, and FIG. 10 is, at a larger scale, a sectional view along line X—X of FIG. 7. In FIGS. 1 and 2 it can be seen that the wiper arm assembly according to the first embodiment of the invention substantially comprises the following parts or elements : a mounting head 1 rigidly secured to a drive shaft A-B (geometrical axis), spring means 4 located inside a steel channel 2 which may be biased towards the surface to be wiped, a plastic sliding element 9 located inside the channel 2 which is provided with an arm extension 3 (to which the wiper blade—not shown—is attached at 3a) and a rod 12 which at one of its ends is articulated (10,11) to the sliding element 9 and, at the other of its ends (10a,11a), to the vehicle body 14.

When the wiper arm assembly is working, i.e. when the mounting head 1, the channel 2 and the arm extension 3 are oscillating about the drive shaft A-B, the rod 12 imparts a back and borth movement to the sliding element 9 and thus to the arm extension 3 and to the wiper blade (not shown). The sliding element 9 and the arm extension 3 are farthest away from the drive shaft A-B when the longitudinal axis of the channel 2 and of the arm extension 3 (FIG. 2) is passing over the articulation 10a, 11a which connects the rod 12 to the vehicle body 14. This position of the sliding element 9 and of the arm extension 3 is shown by interrupted lines in FIG. 1.

It is to be noted that the mounting head 1 is provided with three pivots (rivets or pins): the rivet 6 about which the channel 2 can oscillate, the pin 7 about which the supporting element 4a of the spring means 4 can oscillate and the pin 8 about which the drive shaft protecting cap 5 can rotate.

The extremity of the channel 2 which is farthest away from the mounting head 1 is closed by means of a cap 2a. In the cap 2a there is provided an opening through which the arm extension 3 can move back and forth.

FIGS. 3, and 4 show, at a larger scale, the details of the portion of the steel channel 2 (of the embodiment of FIG. 1) wherein the plastic sliding element 9 is located. In those two figures it can be seen that between the outer walls of the sliding element 9 and the inner walls of the channel 2, a plastic sheath 13 is located. The object of the sheath 13 is to diminish the friction between the plastic sliding element 9 and the steel channel 2. Indeed, the friction between the plastic sliding element 9 and the steel channel 2 would very quickly wear out the sliding element 9.

FIGS. 5 and 6 show the details of execution of the portion of the steel channel 2 (of the second embodiment) wherein a steel sliding element 9a is located. In order to diminish the friction between the steel walls of both elements 2,9a, steel balls 15,15a, partially located in the body of the sliding element 9a, are provided. The steel balls 15 roll on the two inner side walls of the channel 2 and the steel balls 15a roll on the inner top wall of the channel 2 when the sliding element 9a moves back and forth. The steel balls 15,15a can of course be replaced by steel rollers.

FIGS. 7-10 show the details of execution of the portion of the steel channel 2 (of the third embodiment) wherein a plastic sliding element 9b is located. Just as in FIG. 3 a plastic sheath 13 is provided between the outer walls of the plastic sliding element 9b and the inner walls of the steel channel 2. In order to further diminish the friction between the plastic sliding element 9b and the plastic sheath 13, plastic balls 15',15a', partially located in the body of the plastic sliding element 9b, are provided. The plastic balls 15' roll on the two inner side walls of the sheath 13 and the plastic balls 15a' roll on the inner top wall of the sheath 13 when the sliding element 9b moves back and forth. Said plastic balls 15', 15a' can of course be replaced by palstic rollers.

In FIGS. 3-10, it can be seen that on its bottom wall the sliding element 9,9a,9b is only partially covered by the two portions 2b of the channel 2, there being a longitudinal space between said two portions 2b. This longitudinal space allows the ball joint 10,11 to move back and forth with the sliding element 9,9a,9b.

Concerning FIGS. 3, 5, and 7 it is to be noted that (a) FIG. 3 is a sectional view, at a smaller scale, along line III—III of FIG. 4, (b) FIG. 5 is a sectional view, at a smaller scale, along line V—V of FIG. 6 and (c) FIG. 7 is a sectional view, at a smaller scale, along line VII—VII of FIG. 10.

As already described above the rod 12 is connected, at one of its ends, by means of a ball joint 10,11 to the sliding element 9,9a,9b and, at the other of its ends, by means of a ball joint 10a,11a to the vehicle body 14. Principally said two ball joints 10,11 and 10a,11a are identical and comprise a steel ball 10,10a and a plastic cap 11,11a respectively.

The plastic cap 11,11a of each ball joint 10,11 and 10a,11a includes an elongate portion for attaching it to the rod 12, which is locally provided with a reduced cross section 11', 11a' which can, for example, have the form of a circular section. The object of the said reduced cross section is to complement the action of the two ball joints 10,11 and 10a,11a, (i.e. to allow the rod 12 to augularly move in any direction with respect to the sliding element 9,9a,9b and the vehicle body 14. The angular movement of the rod 12 is particularly necessary when the windshield of the vehicle is strongly curved.

I claim:

1. A wiper arm assembly for motor vehicles or the like, comprising:
    a mounting head rigidly secured to a drive shaft;
    a channel coupled to said mounting head;
    spring means coupled between said mounting head and said channel and biasing an outer end of said channel towards the surface to be wiped;
    a sliding element located inside a portion of said channel spaced from said mounting head, said sliding element provided with an arm extension, said sliding element being connected to the vehicle body by means of a rod provided with an articulation at both of its ends; and
    macroscopic, solid, antifriction means comprised of balls or rollers located between the outer walls of said sliding element and the inner walls of said channel portion, for reducing friction between said sliding element and said channel portion along a substantial length of said channel portion.

2. A wiper arm assembly according to claim 1, whereins aid channel is made of steel and said sliding element is made of a plastic material.

3. A wiper arm assembly according to claim 2, wherein said balls or rollers are formed of plastic.

4. A wiper arm assembly according to claim 1, wherein said channel and said sliding element are made of steel.

5. A wiper arm assembly according to claim 4, wherein said solid anti-friction means further comprises a metal sheath.

6. A wiper arm assembly according to claim 5, wherein said balls or rollers are made of steel.

7. A wiper arm assembly according to claim 6, wherein said steel balls or steel rollers are partially located in the body of said steel sliding element.

8. A wiper arm assembly according to claim 4, wherein said balls or rollers are made of steel.

9. A wiper arm assembly according to claim 8, wherein said steel balls or steel rollers are partially located in the body of said steel sliding element.

10. A wiper arm assembly according to claim 1, wherein said solid anti-friction means further comprises a sheath.

11. A wiper arm assembly according to claim 10, wherein said balls or rollers are formed with plastic and are partially located in the body of said sliding element.

12. A wiper arm assembly according to claim 11, wherein said sliding element and said sheath are formed of plastic.

13. A wiper arm assembly according to claim 1, wherein said balls or rollers are partially located in the body of said sliding element.

14. A wiper arm assembly according to claim 13, wherein said sliding element and balls or rollers are all formed of plastic.

15. A wiper arm assembly according to claim 1, wherein the articulation at each end of said rod is materialized by means of a ball joint.

16. A wiper arm assembly according to claim 15, wherein said ball joint comprises a steel ball and a corresponding plastic cap.

17. A wiper arm assembly according to claim 16 wherein said plastic cap comprises an elongate portion locally provided with a reduced cross section.

18. A wiper arm assembly according to claim 1, wherein said balls or rollers are formed of a material selected from the group consisting of plastic or steel.

* * * * *

UNITED STATES PATENT AND TRADEMARK OFFICE
CERTIFICATE OF CORRECTION

PATENT NO. : 4,918,780

DATED : April 24, 1990

INVENTOR(S) : Marcello Scorsiroli

It is certified that error appears in the above-identified patent and that said Letters Patent is hereby corrected as shown below:

Column 1, line 8, after "wiped", insert a comma (--,--);
line 37, before "channel", delete "said", and after "that" , insert a comma (--,--);
line 39, after "channel", insert a comma (--,--).

Column 2, line 16, after "FIG.7", start a new paragraph with "In FIGS. 1 and 2", and after "2", insert a comma )--,--);
line 32, change the word "borth" to --forth--;
line 46, after "oscillate", insert a comma (--,--);
line 50, after "2a", insert a comma (--,--); and
line 55, after "figures", insert a comma (--,--).

Column 3, line 4, place a comma (--,--) before "of course" and a comma (--,--) after "course";
line 19, cancel "Said: and substitute therefor --The--;
line 20, place a comma (--,--) before "of course" and a comma (--,--) after "course";
correct the spelling of "palstic" to --plastic--;
line 21, insert a comma (--,--) after the last word "wall";

UNITED STATES PATENT AND TRADEMARK OFFICE
CERTIFICATE OF CORRECTION

PATENT NO. : 4,918,780
DATED : April 24, 1990
INVENTOR(S) : Marcello Scorsiroli

It is certified that error appears in the above-identified patent and that said Letters Patent is hereby corrected as shown below:

Column 3, line 27, insert a comma (--,--) after "7";
line 33, insert a comma (--,--) after "above";
line 37, after "Principally", insert a comma (--,--), cancel "said" and substitute therefor --the--;
line 39, after "11a" insert a comma (--,--);
line 44, after "the", cancel "said";

line 48, insert a closing parenthesis (--)--) after "14".

Column 4, line 14 (claim 2), correct "whereins aid" to --wherein said--.

Signed and Sealed this

Twenty-sixth Day of November, 1991

Attest:

HARRY F. MANBECK, JR.

*Attesting Officer*     *Commissioner of Patents and Trademarks*